United States Patent [19]
Sato

[11] 3,773,398
[45] Nov. 20, 1973

[54] ROLLER BEARING

[76] Inventor: Kozo Sato, 89 Minami, 3-chome, Yamamoto-cho, Yao-shi, Osaka-fu, Japan

[22] Filed: Mar. 27, 1972

[21] Appl. No.: 238,451

[30] Foreign Application Priority Data
Feb. 25, 1972  Japan.............................. 47/20757

[52] U.S. Cl. .............................................. 308/215
[51] Int. Cl. ............................................. F16e 33/66
[58] Field of Search ...................................... 308/215

[56] References Cited
UNITED STATES PATENTS

| | | | |
|---|---|---|---|
| 458,317 | 8/1891 | Howyer.............................. | 308/215 |
| 588,667 | 8/1897 | Tellefsen et al. ................... | 308/215 |
| 1,266,286 | 5/1918 | Lockwood .......................... | 308/215 |
| 2,197,883 | 4/1940 | Sinclair............................... | 308/215 |
| 3,410,618 | 11/1968 | Harris et al. ....................... | 308/215 |

*Primary Examiner*—Charles J. Myhre
*Assistant Examiner*—Frank Susko
*Attorney*—E. F. Wenderoth et al.

[57] ABSTRACT

A roller bearing having rollers which are tubular metal cylinders. The inside of each of said metal cylinders is filled with a lubricant and small holes are bored directly through the metal cylinders. Alternatively, a plurality of metal cylinders is juxtaposed with minute spacings formed between adjacent metal cylinders, respectively. Accordingly, the lubricant is extruded outwardly from the inside of the metal cylinders through the small holes or minute spacings in accordance with the rotary movement of the roller bearing.

3 Claims, 5 Drawing Figures

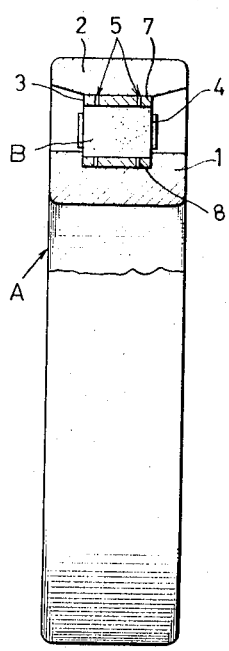
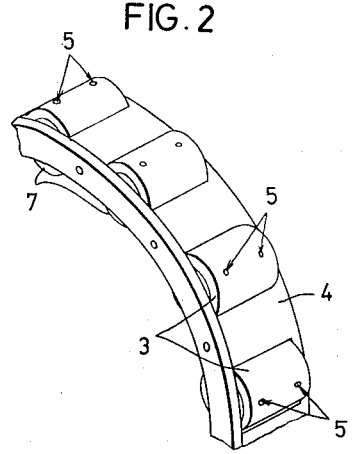
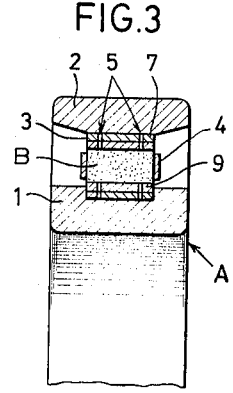
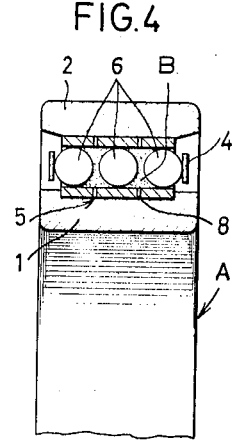
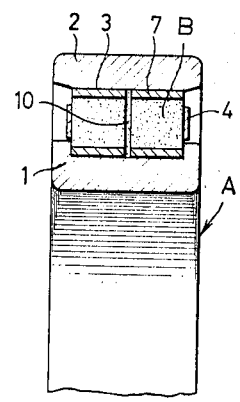

ROLLER BEARING

This invention relates to a roller bearing, the rollers thereof being tubular metal cylinders. The inside of said metal cylinders are filled with a lubricant and extraction conduits are provided on the metal cylinders in order to extract the lubricant from the inside of said metal cylinders.

Generally, known roller bearings have had a great common defect in respect to antifriction methods and the retention of lubricant as an antifriction means as described below.

a. When the roller bearing is subjected to impact friction, the bearing can hardly absorb said impact because of the absence of shock absorbing space therein.

b. Violent sliding friction arises between the roller retainer and the side of the roller and abrasions caused by such sliding friction greatly shortening the life of the bearing.

c. There is not enough space inside the bearing to retain lubricant with the result that, even if lubricant is supplied in large quantities, the greater part thereof is pushed out of the rollers by the rotary movement of said rollers. Consequently, the lubricant must be replenished frequently in small quantities; otherwise trouble will arise from the abrasion caused by a shortage of lubricant.

A first object of this invention is to obviate the constructional defects of the known roller bearings by replacing the rollers with tubular metal cylinders, sufficient space being provided inside said metal cylinders thereby enabling them to absorb the impact from impact friction.

A second object of this invention is to prolong the life of the roller bearings by employing tubular metal cylinders for the rollers thereby minimizing the sliding friction at the side of the rollers.

A third object of this invention is to make it unnecessary to frequently replenish the lubricant by replacing the rollers with tubular metal cylinders which can be filled with lubricant in large quantities.

This invention is directed to a roller bearing having rollers which are tubular metal cylinders. The inside of said metal cylinders are filled with a lubricant and small holes are bored directly through the metal cylinders or a plurality of metal cylinders are juxtaposed with minute spacings formed between the extremities of said metal cylinders respectively so that the lubricant from the inside thereof can extrude outwardly with the rotary movement of the roller bearing.

FIG. 1 is a side view of the roller bearing according to this invention, a part of which is shown in section.

FIG. 2 is a perspective view of the principal part of the roller portion detached from the outer race.

FIGS. 3 to 5 show other embodiments of the roller bearing, each showing a sectional side view of the principal part thereof.

Referring now to FIG. 1, (A) designates a roller bearing, an outer race 2 being fitted around the outer periphery of an inner race 1 with a suitable spacing provided therebetween, rollers 3 being disposed between the inner race 1 and the outer race 2 through a retainer 4 for retaining said rollers 3.

The construction described hereinbefore is identical with that of known roller bearings.

This invention is characterized in that the rollers 3 are tubular metal cylinders 7 consisting of an alloy of nickel and chrome having antiabrasion properties. The inside of the metal cylinders 7 are filled with lubricant (B) and conduits 5 are provided on the metal cylinders 7 to allow the lubricant (B) to extrude outwardly from the inside of the metal cylinders 7.

The roller 3 shown in FIG. 1 is a metal cylinder consisting of an alloy of nickel and chrome having antiabrasion properties. The inside of said roller 3 is filled with a lubricant and small holes 8 penetrating through the peripheral wall of the metal cylinder 7 serve as the conduits 5 so as to enable the lubricant (B) to flow outwardly from the inside of the metal cylinder 7.

The roller shown in FIG. 3 is also a metal cylinder 7 consisting of an alloy of nickel and chrome having antiabrasion properties. However, said metal cylinder 7 is a double cylinder, a smaller diameter metal cylinder 9 being tightly fitted into a larger diameter metal cylinder 7 so that an integral double cylindrical wall is formed.

If the cylindrical wall is reinforced as described hereinbefore by integrally duplicating said wall by tightly fitting a metal cylinder 9 into a metal cylinder 7, the resultant duplex cylindrical wall has greater resistance to impact even when the roller bearing (A) is subjected to violent loaded impact friction.

Also in the case of the roller 3 in FIG. 3 which comprises a metal cylinder 9 and a metal cylinder 7 tightly fitted to each other so as to form a duplex metal cylinder, it goes without saying that small holes 8 are bored through the peripheral wall of each said metal cylinders 7 and 9, extraction conduits thus being formed enabling the lubricant (B) to flow from the inside of the cylinder through said small holes 8.

The roller 3 shown in FIG. 4 is also a metal cylinder 7 consisting of an alloy of nickel and chrome having small holes penetrating through the peripheral wall of the metal cylinder 7 so that the lubricant (B) can be extracted from the inside of said metal cylinder 7. In this embodiment, however, a plurality of balls 6 are inserted into the metal cylinder 7. This roller bearing is useful in locations which are subjected to great impact friction arising from high speed rotation or violent static friction arising at the time of starting or braking.

The embodiment illustrated in FIG. 5 is different from each of the embodiments described hereinbefore in that two metal cylinders 7 which are juxtaposed have no small holes penetrating through the peripheral wall thereof.

When the two metal cylinders 7 are juxtaposed as shown in FIG. 5, the lubricant (B) is extracted from the inside of said metal cylinders 7 through a minute spacing 10 formed between the opposed extremities of the juxtaposed metal cylinders 7. In this case, the minute spacing 10 between the metal cylinders 7 forms an extraction conduit 5 for the lubricant (B).

As described hereinbefore, the roller bearing (A) of this invention has metal cylinders 7 in place of the conventional rollers, the inside of said cylinders 7 being filled with a lubricant (B), said lubricant (B) being extracted from the inside of said metal cylinders 7 through small holes 8 bored through the peripheral walls thereof or through a minute spacing 10 formed between each pair of juxtaposed metal cylinders 7.

By extracting the lubricant (B) from the inside of the metal cylinders 7 consecutively, the rolling friction of the metal cylinders 7 against the inner race 1 and the outer race 2 can be reduced. This reduction of the rolling friction has been realized for the first time by the construction of this invention wherein the rollers 3 are replaced by metal cylinders which are filled with a lubricant (B) and provided with extrusion conduits 5 for said lubricant.

Moreover, since the rollers 3 are replaced by metal cylinders, the contact area between the rollers and the side of the retainer thereof is remarkably reduced with the result that the sliding frictional loss arising from the rotary movement of the rollers is also remarkably reduced.

In particular, since the inside of the rollers which are metal cylinders is filled with a lubricant, said lubricant is retained in large quantities in the lateral spaces of the rollers where sliding friction arises; thus the rotary movement thereof minimizes the loss resulting from heavy sliding friction.

Furthermore, the rollers consisting of metal cylinders can be filled with an abundance of lubricant without the risk of said lubricant being pushed out by the movement of the rollers. In addition thereto, the lubricant is retainable for a long period of time without frequent replenishment, a necessary quantity of said lubricant being consecutively supplied to the peripheral walls of the rollers in accordance with the rotary movement thereof through small holes bored through the peripheral walls of said metal cylinders or through minute spacings formed between juxtaposed metal cylinders.

What is claimed is:

1. A roller bearing comprising an inner race, an outer race, and a plurality of tubular rollers rotatable between said inner and said outer races, each of said tubular rollers having a plurality of penetration holes on the peripheral surface thereof, and a plurality of balls and a lubricant contained within each of said rollers.

2. A roller bearing as claimed in claim 1 wherein the diameter of said balls is substantially equal to the inner diameter of said tubular rollers.

3. A roller bearing as claimed in claim 1 further comprising means for retaining said balls within each of said rollers.

\* \* \* \* \*